Feb. 18, 1930.                E. J. PANISH                1,747,594
                              VALVE CONTROL
                           Filed Feb. 2, 1928         6 Sheets-Sheet 1
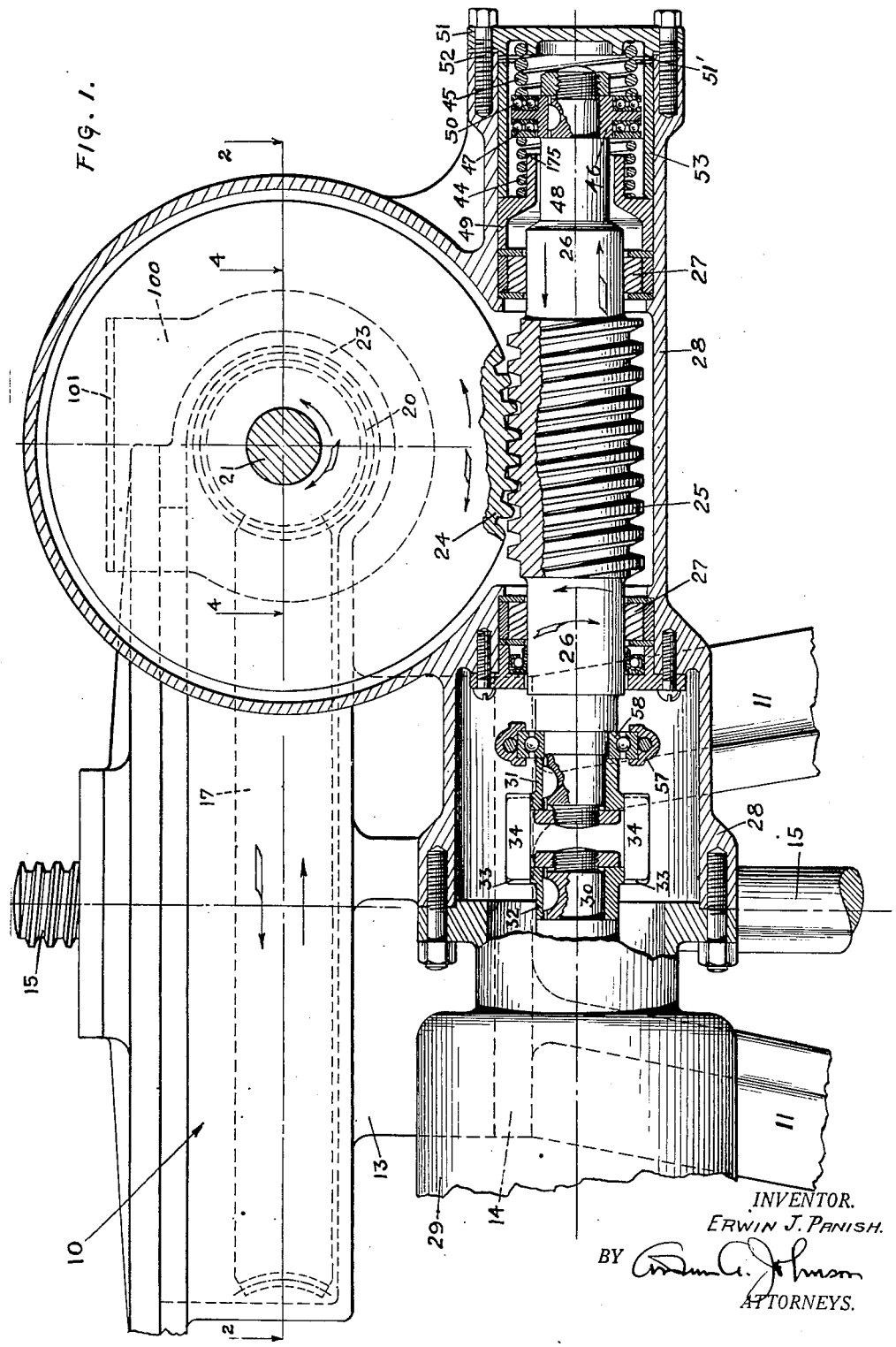
INVENTOR.
ERWIN J. PANISH.
BY
ATTORNEYS.

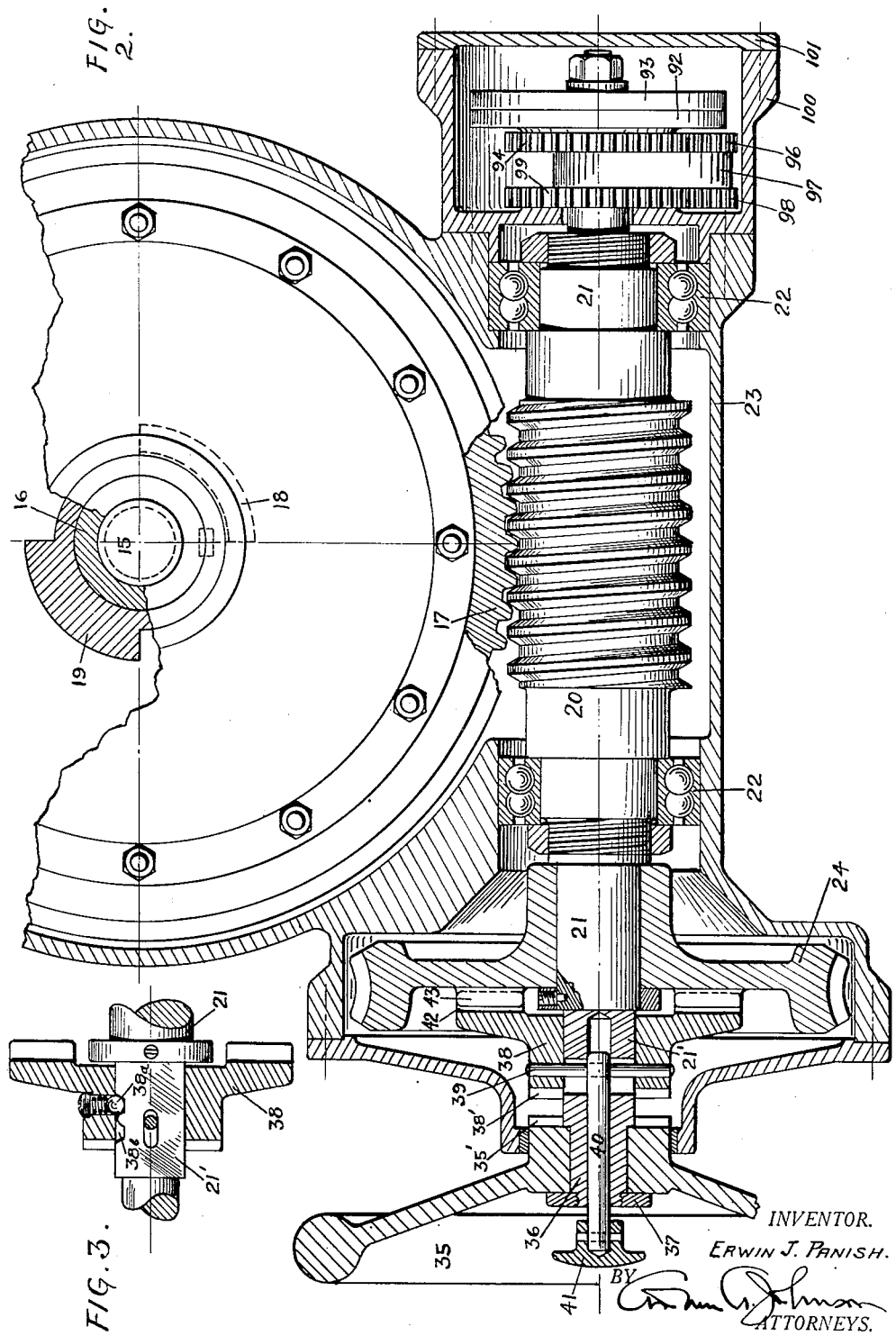

Feb. 18, 1930.　　　E. J. PANISH　　　1,747,594
VALVE CONTROL
Filed Feb. 2, 1928　　6 Sheets-Sheet 3
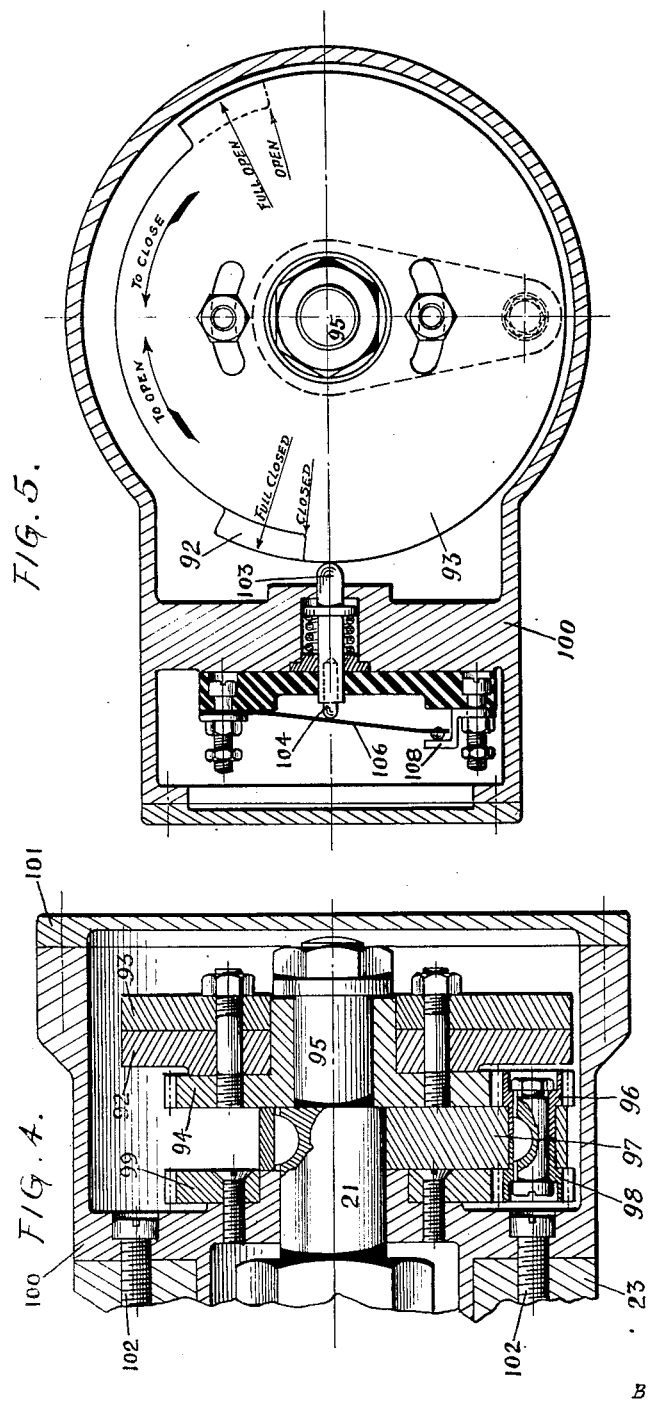
INVENTOR
ERWIN J. PANISH.
BY
ATTORNEYS

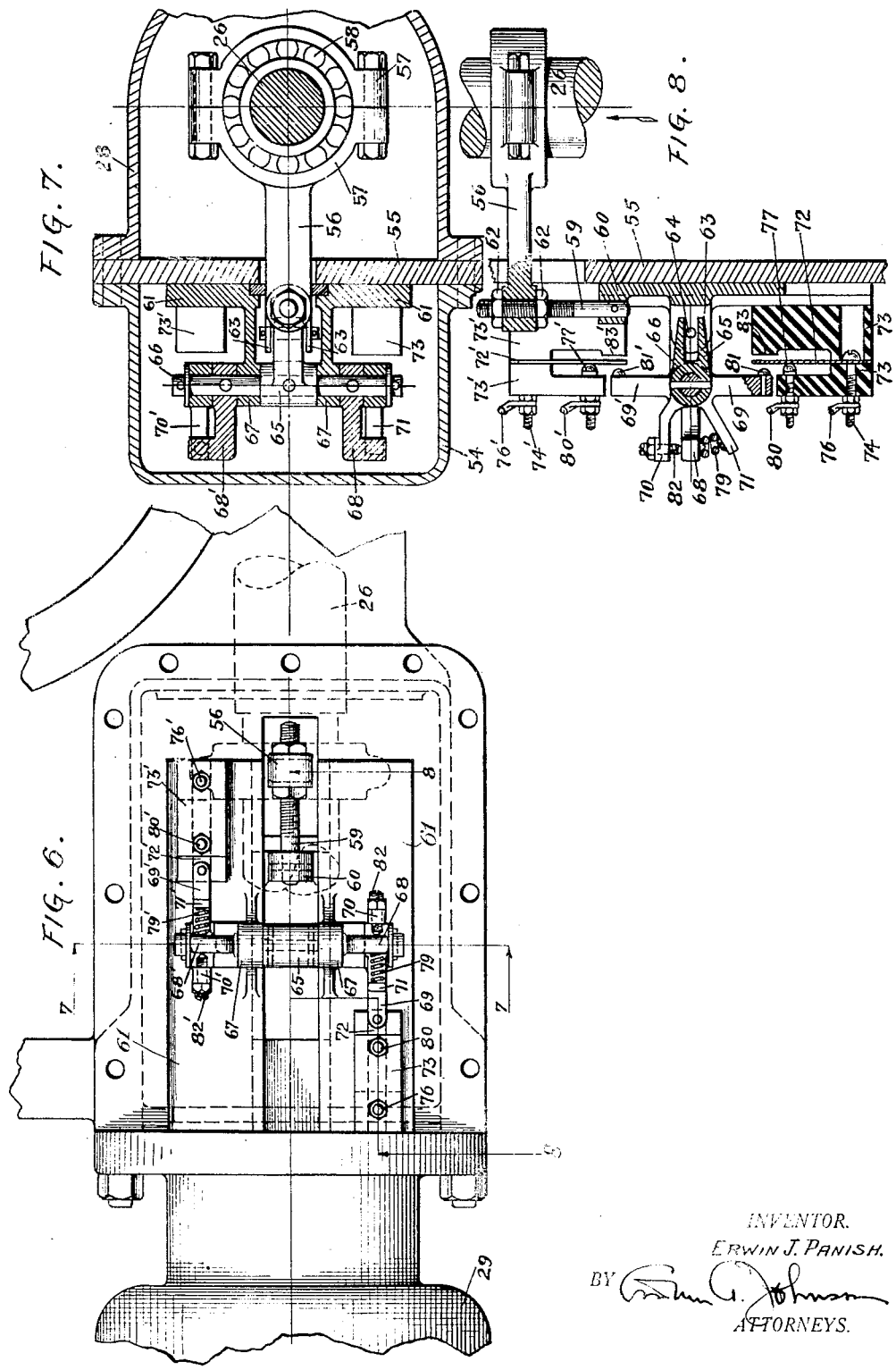

INVENTOR.
ERWIN J. PANISH.

Patented Feb. 18, 1930

1,747,594

UNITED STATES PATENT OFFICE

ERWIN J. PANISH, OF BRIDGEPORT, CONNECTICUT

VALVE CONTROL

Application filed February 2, 1928. Serial No. 251,451.

This invention relates to improvements in valve control mechanisms.

Valve control mechanisms, as heretofore provided, are of several distinct kinds depending upon the way in which the desired result of opening and closing the valve is accomplished. The present invention has in common with these known valve controls an electric motor for supplying power to open and close the valve, selective means for initiating the operations, and means for terminating the valve opening and closing operations according to a predetermined plan.

The most important object of this invention is to provide improved means for terminating the valve closing operation.

A feature of the present invention, accordingly, is the provision of means for permitting the valve to be brought to rest in its seat with a predetermined and constant pressure. This means preferably is actuated as a result of the reaction produced by the cessation of movement of the valve or valve actuating gearing and the continued application of power by the driving motor.

A further feature is the provision of means whereby the predetermined valve-closing power may be varied.

Another feature is the provision of means for applying full motor power to the valve when initiating the opening movement of the valve or "cracking" it, as it is commonly termed.

Another feature is the provision of means for bringing the valve to rest in full open position with a predetermined and constant force.

A still further feature is the provision of means whereby the predetermined and constant force applied when the valve is fully opened may be different from the predetermined and constant force applied when seating the valve. By this means, the force applied when the valve is fully opened may cause the stem shoulder on the valve to be brought gently yet firmly against the bonnet bushing, an operation which is extremely desirable for many reasons, and which heretofore could only be performed by hand-operation of the valve.

In the physical embodiment of the present invention herein shown, these new results and advantageous features are obtained by the provision of a novel mechanism which is extremely simple, and which is simpler than previously known valve controls. For instance, no clutching or declutching mechanism to disconnect the motor from the valve-actuating mechanism, need be provided for the normal automatic control of the valve. Nor is it necessary to provide safety devices, such as friction clutches, shear-pins or overload relays, for, according to the present invention, the motor is automatically rendered inoperative to apply further power to the valve or valve-actuating gearing if the valve should be prevented from reaching the limit of its closing movement.

Moreover, it is not necessary, with the device of the present invention, to provide valve-movement-controlled limit switches for the motor, such as are now universally used in all types of automatic valve-controls. Thus, the troublesome operation of setting limits in the field is obviated; and the danger of jamming a valve, bending the valve stem or stripping the arch nut or other gearing of the valve-actuating gear train, due to faulty setting of the limits, or to accidental changing of the adjustment of the limits, or to changes in the dimensions of parts due to thermal conditions, is avoided.

Heretofore, it has been proposed to provide an electric overload switch or cut-out so that, should the valve be driven to its seat with the motor running or should the movement of the valve be stopped by an obstruction, the stalling of the motor would cause the electric cut-out to function. This arrangement was made solely as a protective feature and not for every-day operation for which it was unsuitable, requiring hand resetting. The device provided by the present invention, while obtaining all the advantages and safeguards of the proposed electric overload cut-out, obtains other advantages and results hereinafter referred to which could not be obtained by the provision of that device.

Other features and advantages will hereinafter appear.

In the accompanying drawings, which illustrate one embodiment of the invention, that at present preferred—

Figure 1 is an elevation of part of a valve arch showing the valve control device of the present invention, with part of the casing removed or broken away to show in detail part of the driving train of gearing, and other important parts, some of which are shown in section.

Fig. 2 is a longitudinal section taken on the line 2—2 of Fig. 1.

Fig. 3 is a detail view showing the detent for holding the emergency clutch disk in either of its operating positions.

Fig. 4 is a sectional view taken on the line 4—4 of Fig. 1, showing the part of the circuit controlling means controlled by the position of the valve gate through the valve actuating mechanism.

Fig. 5 is a side view of the circuit controlling means shown in Fig. 4, showing part of the switch mechanism controlled thereby.

Fig. 6 is an elevation looking at the device in the same way as in Fig. 1, but showing the automatic switch mechanism which is made operative upon cessation of movement of the valve-actuating mechanism.

Fig. 7 is a transverse sectional view taken on the line 7—7 of Fig. 6.

Fig. 8 is a longitudinal sectional view taken on the line 8—8 of Fig. 6.

Figure 9:
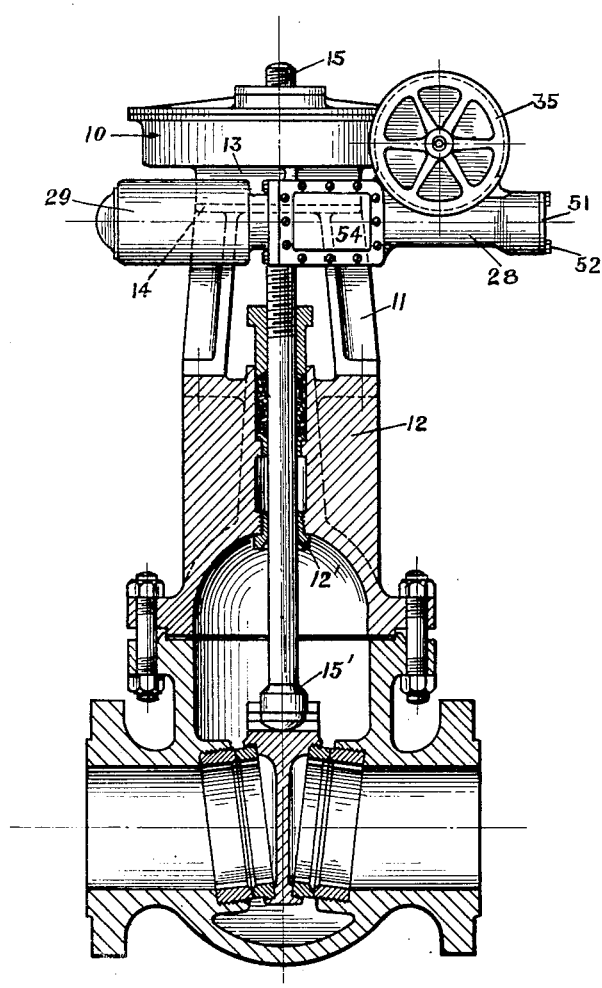
Fig. 9 is an elevation of a gate valve, showing the device of the present invention attached thereto.

The device of the present invention comprises a casing 10 formed of a number of castings secured together for supporting and concealing various parts of the mechanism, and for supporting the device on the arch 11 or other part of the valve 12, a gate valve being shown in Fig. 9 for illustrative purposes. As shown, the part 13 of the casing 10 is adapted to be bolted to the top 14 of the arch so that the screw-threaded valve-stem 15 passes through the casing, as shown in Fig. 1. In this part 13 of the casing is located the arch-nut 16 (see Fig. 2) which engages the valve-stem 15 and by the rotation of which, in opposite directions, the valve-stem and valve disk are moved up and down to open and close the valve.

To rotate this arch-nut 16, there is mounted in the part 13 of the casing, concentric with the valve-stem 15, a worm-wheel 17. This worm-wheel is not fixedly secured to the arch-nut, but instead, is provided with an arcuate lug 18 lying in the path of a companion arcuate lug 19 on the arch-nut. The sum of the arcs of the lugs 18 and 19 is less than 360°, preferably only 180°, so that, in an idle period of motion of the lug 18 between points where it will strike the ends of the lugs 19, the momentum of the worm-wheel 17 may increase with the result that a hammer-blow effect is produced upon the arch-nut. This hammer-blow assists materially in the operation of initially opening the valve, or "cracking", as it is termed.

In the form of the present invention herein shown, the worm-wheel 17 is part of the valve-actuating mechanism, other parts of which are a worm 20 having a shaft 21 carried in bearings 22 in a part 23 of the casing; a worm-wheel 24 supported by and adapted to drive the shaft 21; and a worm 25 having a shaft 26 mounted in bearings 27 carried by a part 28 of the casing 10.

This train of gearing is adapted to be driven by an electric motor 29, whose casing is shown bolted to the end of part 28 of the casing 10, so that the motor shaft 30 is substantially in axial alignment with the worm-shaft 26. The motor shaft 30 is connected to the worm-shaft 26 to drive the same by a coupling which, for facilitating the attachment and removal of a motor and for other purposes herein referred to, preferably is of the sliding type. As shown, this coupling consists of a pair of sleeves 31 and 32 keyed and secured to the shafts 26 and 30 respectively, the sleeve 32 having a pair of slots 33 extending in the direction of and adapted to be engaged by and drive a pair of arms 34 on the sleeve 31. Hence, when a new or replacement motor is being installed, it is merely necessary to see that the arms 34 enter the slots 33, as shown in Fig. 1, before bolting the motor casing to the casing 10; this, without making any mechanical operation to secure the coupling parts together.

For emergency use in case of lack of current to operate the motor or other electrical difficulties, there is provided a hand-wheel 35 (see Figs. 2 and 9), which may be operated by hand to turn the worm 20 and the worm-wheel 17. The hand-wheel 35 is mounted to turn freely on a reduced end 36 of the shaft 21 to which it is held by a nut 37. When it is desired to operate the valve-actuating mechanism by hand, the hand-wheel is coupled to the shaft 21 to drive the same by a clutch disk 38 sliding on a square portion 21' of the shaft 21, being thereby keyed to the shaft to rotate therewith. The clutch disk 38 may be slid on the portion 21' of the shaft to bring its teeth 38' into driving relation with teeth 35' of the hand-wheel 35, by a rod 40 secured to a pin 39 carried by the clutch disk 38 and sliding in the shaft 21. The rod 40 has an accessible knob 41 by means of which the clutch disk 38 may be shifted preparatory to the operation of the hand-wheel. The clutch disk 38 is held in either of its operating positions by a detent 38$^a$ cooperating with notches 38ᵇ in the square portion 21' of the shaft 21, (see Fig. 3).

While it is by no means essential so long as the worms of the valve-actuating means are overhauling, it is preferable that the worm-wheel 24, worm 25, and motor be disconnected from the shaft 21 when opening or closing the valve by hand. For this purpose, the clutch disk 38 is provided, as shown, with teeth 42 adapted to normally engage teeth 43 on the worm-wheel 24 and thereby drive the latter, and these cooperating teeth 42 and 43 are made short enough so that when the clutch disk 38 is shifted to bring the teeth 35' and 38' into engagement, the teeth 42 and 43 are automatically disengaged. Moreover, it is preferable that the teeth 35' and 38' and 42 and 43 be so disposed that at no time may both sets of teeth be engaged, and this is done in the embodiment of the invention shown. In other words, the teeth are so arranged that either teeth 35' or 38' engage, or the teeth 42 and 43 are engaged.

By this arrangement, a novel and important advantage is obtained, for since the hand-wheel cannot become connected to the valve-actuating mechanism so long as the motor is connected thereto, it is impossible for a workman attempting to manipulate the hand-wheel to become injured as a result of the motor turning-over the mechanism. It not infrequently occurs that while one workman is manipulating a hand-wheel to operate the valve, the power to the motor is unexpectedly applied either by a restoration of the line or by deliberate manipulation of another workman. If the first workman at that time should have a firm grasp at the hand-wheel and the hand-wheel and motor were simultaneously engaged with the actuating mechanism, as is the case with previously known devices, he would be in danger of being thrown from the platform, where he must stand to operate the valve, or he might even have his arm or wrist broken. Such personal injuries have been known to occur in the past as a result of these operations.

The hand-operated means, including the clutch disk 38, it should be distinctly understood, is provided for emergency use solely, and that the motor 29, to all intents and purposes so far as the normal or power operation of the device is concerned in the specific embodiment shown, is in continual driving relation with the valve-actuating mechanism, and the latter is in continual driving relation with the arch-nut 16 or other valve opening and closing part, no clutch or declutching mechanism being provided for use in the normal opening and closing of the valve by power.

Considered in this light, the device of the present invention might be assumed to be in the same category as those known types of valve controls in which the motor is in continual driving relation with the valve and in which the motor circuit is automatically interrupted as the valve approaches closed or opened positions, so that the drift, i. e. momentum of the motor and valve-actuating train, may bring the valve-gate to its ultimate position. Such an assumption is not entirely correct, for while the present invention has retained the advantageous feature of avoiding the use of an automatic clutch, it does not depend upon the momentum of the parts and motor to properly seat the valve, for this feature requires a very close and careful setting of limit switches with due regard to temperature and pressure variations. In those previously known devices which depend upon the drift of the motor and parts to seat the valve, the applied seating pressure is variable and depends entirely upon the resistance offered by the valve and the speed of the motor, so that the valve may be jammed too tightly due to a large momentum and small resistance or not be seated at all due to a small momentum and large resistance of the valve; the degree of tightness of the valve being entirely problematical.

To avoid these difficulties, the present invention provides means responsive to the reaction produced as a result of cessation of movement of the valve-actuating mechanism while the motor continues to apply power to the valve-actuating mechanism for rendering the motor inoperative to apply further power to the valve-actuating mechanism. Considered from a slightly different aspect, the present invention provides means for removing the power supplied by the motor to the valve-stem when the torque developed by the motor reaches a predetermined value. This value, as stated, is determined in advance with regard to the ultimate torque which can safely be applied to the valve as dictated by sound engineering principles. While this is true, it is also true that the limit of torque, as a result of which the motor is disconnected, may, under some circumstances, be much less than the maximum limit which can be safely applied to the valve. For instance, when moving the valve in opening direction by means of the present invention, the shoulder 15' on the valve-stem 15 (see Fig. 9) may be brought very gently but firmly against the bonnet bushing 12' of the valve, an operation which has heretofore been impossible except by opening the valve by hand.

The result of the present invention just above described may, of course, be accomplished by several specific mechanisms, and moreover may be accomplished without necessarily stopping the motor so long as the motor is incapable of supplying further power to the valve-actuating mechanism. Hence, the present invention should not be understood to be limited to the specific embodiment of the invention herein described and illustrated.

Since the controlling factor of the device of the present invention is the increasing of the load on the parts of the valve-actuating mechanism, and since increase of load produces increased end-thrust in worm-gearing or other angular toothed gearing, the present invention provides means operated by the increased end-thrust of part of the gear train to render the motor inoperative to apply further power to the valve-actuating mechanism.

Accordingly, the worm-shaft 26 is not held against all end-thrust movements, but instead the bearings 27 are adapted to permit such movement in both directions, which movement is further permitted by the sliding coupling 31—32 between the shaft 26 and the motor shaft 30. Normally, the shaft 26 is held in condition of substantially stable equilibrium between limits of movement endwise, by a pair of springs 44 and 45 located on opposite sides of a disk 46 secured to the shaft 26. The spring 44 is located between an anti-friction thrust bearing 47 and a shoulder 48 on a sleeve 49 carried in the part 28 of the casing 10, and the spring 45 is located between another anti-friction thrust bearing 50 on the disk 46 and a cover plate 51 adapted to be secured to the part 28 of the casing 10 by bolts 52. When assembling the device, a sleeve 53 is placed in the part 28 of the casing, so that as the bolts 52 are drawn up, the cover plate 51 will force the sleeve 53 inwardly until it strikes the sleeve 49 which holds the bearing 27 firmly in the position shown in Fig. 1. To permit adjustment of the tension of the springs 44 and 45, shims 51' may be inserted between or removed from between the sleeve 53 and the cover plate 51.

The springs 44 and 45 are, of course, manufactured so as to have the desired amount of initial tension when assembled. This tension is such that without load the shaft 26 assumes the position shown in Fig. 1. When, however, work is performed by the valve-actuating mechanism as when opening or closing the valve, the shaft moves endwise within its limits an extent dependent upon the resistance which the valve may offer to movement. During ordinary conditions, after movement of the valve has been started and before seating, the shaft moves endwise very little, for the springs 44 and 45 are made stiff enough to prevent any appreciable endwise movement of the shaft under ordinary running load condition.

The gear train of the valve-actuating mechanism is such that the gears travel in the directions of the arrows shown in Fig. 1 when the valve is being closed. Consequently, when the valve-disk becomes seated or when it meets an irresistible obstruction, the increased load resulting therefrom, or the actual stopping of the gear train including the worm-wheel 24, causes the worm 25 to screw through the teeth of the worm-wheel 24, and hence moves axially in the direction of the arrow shown in Fig. 1, thus compressing the spring 45. When the valve is being opened, the motor shaft 30 rotates in the opposite direction, and hence the gears move in the direction of the tailless arrows shown in Fig. 1. When the parts rotate in these directions, should a load greater than that which is predetermined be applied to the valve-actuating mechanism, the worm 25 will move to the left, as seen in Fig. 1 and shown by the tailless arrow therein. At this time the spring 44 is compressed. During compression of either spring 44 or spring 45, no appreciable action, tending to brake the motion of the worm 25 and its shaft 26, results because of the provision of the anti-friction thrust bearings 47 and 50 interposed between the springs 44 and 45 respectively and the disk 46.

Hence it will be seen that the present invention provides means for imparting endwise movement to a part of the valve-actuating train as a result of changes in loads on the other parts thereof.

This endwise movement of the shaft 26 may, according to the present invention, in any suitable way render the motor 29 inoperative to apply further power to the valve-actuating mechanism. If this feature of the present invention were to be employed in the type of mechanism known to the art having a clutch which is thrown out at the time of valve seating, this endwise movement of the shaft 26 would be employed to operate the clutch. However, since it is not preferable at the present time to provide such a declutching mechanism, the present invention provides means controlled by the endwise movement of the worm-shaft 26 for electrically controlling the motor to render it operative or inoperative. Since it is preferable that the valve be controlled from a remote point and since the remote control of the valve mechanism is improved or facilitated by an arrangement of secondary controls, the embodiment of the present invention herein shown does not provide means for directly opening the motor circuit when desired, but does this through the secondary control of the remote control device. The circuit for controlling the motor and secondary remote control circuits being best understood after a complete understanding of the switch operating mechanism which is employed, the latter will now be described, and it should be understood that any suitable electrical system for controlling the motor may be actuated or controlled by this switch mechanism.

In the physical embodiment of the present invention shown in the accompanying drawings, particularly in Figs. 6, 7 and 8, the switch mechanism above referred to is mounted in a housing 54 secured upon a part 28 of the casing 10 which encloses the sliding coupling 31—32 and the adjacent end of the worm-shaft 26, the housing 54 being separated from the portion 28 of the casing by a plate 55. The plate 55 is provided with an elongated slot through which an arm 56 having a two-part clamp 57 by means of which it is secured to the outer race of a ball-bearing 58, the inner race of which is secured to the worm-shaft 26. Hence, when the worm-shaft 26 moves endwise, the arm 56 is moved in the slot in plate 55. Within the housing 54, the end of the arm 56 is connected by a screw rod 59 with a slide 60 riding on the plate 55 between rails formed by a pair of plates 61. The rod 59 passes freely through the arm 56, but is held thereto by a pair of nuts 62 by means of which the relative position of the arm 56 and the rod 59 may be adjusted. This adjustment is provided so that the slide 60 may be in a predetermined neutral position at the time that the worm-shaft 26 is in its neutral position as determined by the balance resulting from the action of the springs 44 and 45 against each other. After the device is assembled and before any further adjustments of any kind are made, the nuts 62 are so adjusted on the screw rod 59 that the slide 60 assumes its neutral position, that shown in Fig. 8.

The slide 60 carries arms 63 having a cross-pin 64 located in forked arms 65, the fork being located between the arms 63. The forked arm 65 is pinned to a shaft 66 passing through a pair of bearings 67, one being formed integral with each rail plate 61. The shaft 66 has a pair of arms 68 and 68′ pinned thereto (see Fig. 7) and these arms cooperate with levers 69 and 69′ mounted to rotate the shaft 66. The levers 69 and 69′ are provided respectively with a pair of arms 70 and 70′ and 71 and 71′ lying in opposite sides of the arms 68 and 68′. The arrangement is such that when the shaft 66 is rocked by movement of the slide 60, caused by endwise movement of the worm-shaft 26, the levers 69 and 69′ will also be rocked, one toward the plate 55 and the other away from the plate 55, according to the direction of rotation of the shaft 66.

The levers 69 and 69′ are adapted to control a pair of circuit opening means comprising contact springs 72 and 72′ mounted in blocks of insulating material 73 and 73′ each secured to its adjacent rail 61. The springs 72 and 72′ are secured to the blocks 73 and 73′ by screws 74 and 74′ provided with a pair of nuts by means of which wire terminals 76 and 76′ are adapted to be electrically connected to the contact springs 72 and 72′. Also supported on the blocks 73 are contact points 77 and 77′ adapted to be electrically connected with wire terminals 80 and 80′. Normally, the contact springs 72 and 72′ engage their contact points 77 and 77′ respectively, so as to close the circuit between the wires 76 and 80 and 76′ and 80′ respectively (see Fig. 8).

When the worm-shaft 26 is moved in the direction of the arrow shown in Fig. 8, the levers 69 are rocked counter-clockwise with the shaft 66, causing an insulated button 81 on the lever 69 to engage the contact spring 72 and remove it electrically from the contact point 77 so as to open the circuit, of which the wire terminals 76 and 80 form a part. If, however, the worm-shaft 26 is moved in the other direction, the shaft 66 will be rocked clockwise, and accordingly the arm 69′ and button 81′ will engage its adjacent spring 72′ to open the circuit, of which wire terminals 76′ and 80′ form a part. Thus, when the shaft 66 with the arms 69 and 69′ is rocked in either one direction or the other, either one circuit or the other is opened.

It was above stated that the arms 70 and 70′ and 71 and 71′ on the lever 69 and 69′ embrace one of the arms 68 and 68′ on the shaft 66, and for the purpose of explaining the operation of the device it was presumed that the contact between the arms and the levers was direct. This, however, is not so, for it is preferable that springs 79 and 79′ be located between the arms 68 and 68′ and the arms 71 and 71′ while an adjustable screw 82 and 82′ is located between the arms 70 and 70′ and the arms 68 and 68′. The springs 79 and 79′ are provided so that there may be a yielding connection between the levers 69 and 69′ and the arms 68 and 68′, first to enable the position of the levers 69 and 69′ to be adjusted with relation to their arms 68 and 68′ by manipulation of a single screw, and secondly so that means may be provided to prevent the arms 69 and 69′ from bending the springs 72 and 72′ beyond their elastic limits. This means comprises a platform or ledges 83 and 83′ on the blocks 73 and 73′ of insulating material located directly under the ends of the springs 72 and 72′ at the points at which they are engaged by the insulating buttons 81 and 81′ on the arms 69 and 69′. Thus, when the arms 69 and 69′ rock, the buttons 81 and 81′ engage the contact springs 72 and 72′ and move the contact springs against the ledges 83 and 83′ which prevent further movement of the contact springs 72 and 72′. Any further movement of the arms 68 and 68′ will consequently merely compress the springs 79 and 79′. The screws 82 and 82′ in the arms 70 and 70′ are provided for the purpose of initially locating the circuit opening levers 69 and 69′ so that the actual braking of the circuits between the contact springs 72 and 72′ and contacts 77 and 77′ will occur when desired. Consequently, the time of the actual brake of the circuits controlled by the respective contact springs 72 and 72' is controlled by the position of the screws 82 and 82' in the arms 70 and 70' of the respective levers 69 and 69'. Of course, adjustment of the screws merely controls the initial gaps between the insulating buttons 81 and 81' and the contact springs 72 and 72' so that more or less movement of the levers 69 and 69' is required before the contact springs 72 and 72' are engaged and the respective circuits opened. The circuits controlled by the wire terminals 76 and 80 and 76' and 80' will be described below.

To indicate at the control station when the valve is closed and when it is open, there are provided pilot lights 90 and 91 (see Fig. 10) which are controlled by automatic switches operated by the worm-shaft 21 (see Figs. 2, 4 and 5). This automatic switch mechanism comprises a pair of cam disks 92 and 93 for controlling the pilot lights 90 and 91 respectively. The cam disks 92 and 93 are bolted to a gear 94 loosely mounted on the reduced end 95 of the worm-shaft 21, the bolts passing through slots in the disks to permit the disks to be adjusted relative to each other and to the gear 94 to vary the point in the operation of a mechanism at which the pilot lights 90 and 91 are made effective and ineffective. The gear 94 meshes with an epicyclic gear 96 rotatably mounted in an arm 97 keyed to the shaft 21. The epicyclic gear 96 is secured to rotate with a companion epicyclic gear 98 which meshes with a sun gear 99 secured to a housing 100 for the cams 92 and 93 and epicyclic gear train. The housing 100 is closed by a cover 101 and is secured to the portion 23 of the casing 10 by bolts 102.

From the description of the gear train thus given, it will be understood that as the shaft 21 rotates, the epicyclic gears 96 and 98 are carried around the sun gear 99 by the arm 97 with the result that the cam gear 94 rotates at a greatly reduced angular speed, so that for the full movement of the valve, less than a complete revolution is imparted to the cam-disks 92 and 93.

The cam disks 92 and 93 are provided with spring-pressed followers 103 slidably mounted in a cross-rib in the housing 100, and the cam disks 92 and 93 are cut away so as to allow the followers to move toward the axes of the disks when the cut portions thereof lie adjacent the followers. The followers 103 are provided with insulating buttons 104. The follower 103, which cooperates with the disk 92, is adapted to control, through its insulating button 104, a contact spring 105, while the follower 103, cooperating with the cam disk 93, is adapted to control a contact spring 106, the spring 105 cooperating with a contact point 107 and the spring 106 cooperating with a contact point 108, and the springs 105 and 106 being normally so biased as to disengage their respective contacts 107 and 108 when allowed to do so by their followers 103. The contact spring 105 and contact 107 are adapted to control electrical circuits leading to the pilot light 91 which is green and which indicates that the valve is closed while the contact spring 106 and contact 108 control a circuit leading to the pilot light 90 which is red and which indicates that the valve is open, the cam disks 92 and 93 being so arranged with relation to the valve-disk that these respective switches are made operative when the valve disk is closed and opened. The circuits controlled by the contact springs 105 and 106 will be described below.

The valve control device of the present invention, in common with other valve controls heretofore provided, has a control station S which may be located in the vicinity of the valve or at a remote point, as desired. This valve control station S herein illustrated comprises a box 109 in which is mounted a valve-opening button 110, a valve-closing button 111, and a stop button 112, by means of which the valve may be brought to rest at any position which it may assume at the time the button 112 is depressed.

Cooperating with the control station S is an electromagnetic reversing switch or contactor C comprising a box 113 in which is mounted a solenoid 114 for controlling the circuits during opening of the valve and a solenoid 115 for controlling the circuits during closing of the valve. The solenoid 114 is provided with an armature 116 having contacts 117, 118 and 119, while the closing solenoid 115 is provided with an armature 120 carrying contacts 121, 122 and 123.

When the closing button 111 is pressed and the solenoid 115 is energized, the armature 120 is moved to bring its contacts 121, 122 and 123 into engagement with cooperating contact points therefor. As a result of this, current flows from the power-line $L^2$ through the fields F of the motor 29, thence through wire 124 to the contact point 125, through the contact 123 to the contact point 126, through wire 127 connected to the brush terminal 128, through the armature A to the other brush terminal 129, through the wire 130 to the contact point 131, through the contact 122 on the armature 120 to the contact point 132, through the wire 133 to the junction 134 connected by the wire 135 to the other line $L^1$ of the power-line. This causes the motor to rotate in the direction necessary to close the valve.

Should the button 110 be operated and its associated solenoids 114 be energized, the armature 116 will be moved so that its contacts 117, 118 and 119 are moved to circuit-closing positions. When this happens, current flows as before from the positive line $L^2$ of the power-line through the field F and wire 124 to the contact point 125, where a wire 136 is connected with a contact point 137. Since the armature, as stated, is in its operative position, current then flows from the contact point 137 through contact 119 to contact point 138, then through wire 139 to contact point 131 joined with the wire 130 leading to the brush terminal 129, through the armature to the brush terminal 128, through wire 127 to contacts 126 which is joined by a wire 140 to contact point 141, from which current flows through the contact 118 to a contact point 142 connected by a wire 143 to the junction 134. From the junction 134 current flows back through the wire 135 to the negative line $L^1$ of the power-line. It will be noted that in the circuit just described, the current flows through the armature in the opposite direction to that of the circuit previously described, and hence the motor will run in the opposite direction, that desired for opening the valve.

Assuming that the valve is open and that it is desired to close the same fully, the operator depresses the closing button 111 which has a contact 144 adapted to bridge contact points 145 and 146. When this is done, current flows from the positive line $L^2$ of the power-line through a wire 147 to the stop button 112, then to a junction 148 connected by a wire 149 to the contact point 145. Current flows from the contact point 145 through the contact 144 to the contact point 146, thence through a wire 150 to a junction 151 which is connected to a wire 152 to the terminal 80 of the valve-automatic closing switch. At this point, current then flows from the terminal 80 through the contact point 77, contact spring, terminal 76, wire 153 to the terminal 154 of the solenoid 115, the other terminal 155 of which is connected by a wire 156 to a junction 157 connected to the wire 135 leading back to the negative line $L^1$ of the power-line. As a result of the completion of this circuit, the armature 120 is moved to make its contacts 121, 122 and 123 operative with the result that the motor moves in closing direction, current flowing through the circuits above referred to.

At the same time, the contact 121 on the armature 120 closes a holding circuit including contacts $H^4$ and $H^3$, the former being connected by a wire $H^5$ through junction 151 to the wire 152, automatic switch 77—72, wire 153, terminal 154, solenoid 115, terminal 155, wire 156, junction 157 and wire 135 to the negative power line $L^1$ and the latter being connected by a wire $H^2$, junction $H^{10}$, wire $H^1$ through junction 148, the stop button 112 and wire 147 to the positive power-line $L^2$. By this arrangement, the solenoid 115 is maintained operative to keep the motor circuit closed until a break occurs in the circuit, above described, either at the stop button 112 or the automatic switch 77—72.

The disk of the valve then descends towards its seat as the result of the operation of the valve-actuating mechanism. When the valve disk reaches its seat, or when it ceases to move, the resultant increase in load on the valve-actuating mechanism causes the worm-shaft 26 to overcome the pressure of the spring 45 and move endwise in the direction of the arrow shown in Fig. 10. This causes the automatic switch mechanism to be operated so that the arm 69 removes the contact spring 72 from the contact 77 and opens the circuit comprising wire 147 connected to the power line $L^2$, stop button 112, junction 148, wire $H^1$, junction $H^{10}$, wire $H^2$, contact point $H^3$, contact 121, contact point $H^4$, wire $H^5$, junction 151, wire 152, terminal 80, contact 77, contact spring 72, terminal 76, wire 153, terminal 154, solenoid 115, terminal 155, wire 156, junction 157, wire 135, which, it will be remembered, leads back to the negative power $L^1$. As soon as the solenoid 115 is inoperative, which takes place automatically upon braking of the above circuit, its armature retracts moving its contacts 122 and 123 away from contact points 131, 132 and 125 and 126 respectively, thus opening the motor circuit causing the motor to be rendered inoperative. At the same time, the contact 121 is moved away from the holding arrangement contacts $H^3$ and $H^4$, so that when the contact spring 72 again moves into engagement with contact 77, as a result of the return of the worm-shaft 26 to normal position under the influence of spring 45, the control circuit will remain open until the button 111 is again operated.

If it be desired at that time, in order to more tightly seat the valve or to send another surge of power through the valve-actuating mechanism to the valve, for any reason, this may be done merely by depressing the closing button 111 without first "backing-off" the valve, as is necessary with valve controls heretofore provided. This is possible because, as soon as the motor is rendered inoperative, the pressure of the spring 45 will cause the worm 25 to screw through the teeth of the worm-wheel 24 and consequently move axially and remake the stopping switch comprising the contact 77, contact spring 72 and terminal 76. Since the circuit through the stopping switch 77—72 is thus closed, the depression of the closing button 111 can close the circuit through the solenoid 115 as it does when initiating the closing movement of the valve. Of course, if the valve-actuating mechanism can be moved no further by the motor, even by the hammer-blow produced between the abutment 18 on the driving wheel 17 and the abutment 19 on the nut 16, the worm 25 will again screw through the worm wheel 24, causing the worm shaft 26 to move endwise and again automatically open the switch 77—72. When this happens, the circuit through the solenoid 115 is broken and the motor is inoperative. Should the button 111 be held down manually, the circuit through the solenoid 115 will again be closed by the retrograde movement of the worm shaft 26 and the motor will again start and operate until the worm 25 again screws thru the worm wheel 24. These operations will be repeated indefinitely so long as the manually operable button 111 is held down.

To open the valve, the button 110 is depressed. This closes the control circuit comprising wire 147 connected to the power line L², stop button 112, junction 148, a wire 158, a contact point 159, a contact 160 on the button 110, a contact point 161, a wire 162, a junction 163, a wire 164, terminal 80', contact spring 72', contact 77', terminal 76', wire 165, junction 166, wire 167, terminal 168 of the solenoid 114, terminal 169, wire 170, junction 157, wire 135 leading to power line L¹. As the result of the closing of this circuit, the armature 116 of the solenoid 114 is caused to move its contacts 118 and 119 to close the motor circuit so that the motor rotates in the valve-opening direction.

At the same time the contact 117 closes a holding circuit comprising contacts H⁶ and H⁷, the former being connected to wire 162 and the latter being connected to a wire H⁹ having a junction H¹⁰ with the wire H¹ which, through junction 148, the stop-button 112 and wire 147 leads to the power line L². Thus, the control circuit may be automatically held closed while the button 110 is manually released and allowed to return to circuit-opening position shown in Fig. 10.

It will be remembered that the force with which the valve may be seated, according to the present invention, is controlled by the spring 45 which resists axial movement of the worm-shaft 26, and that this spring is so designed that it will yield to a force below maximum force which may safely be applied to the valve and valve-actuating parts. Experience has shown that more power is required in starting to open the valve than was used to seat the valve. Consequently, it would seem necessary that the spring 44, which resists axial movement of the worm-shaft 26 when the parts are moved in valve-opening direction, should be stiffer or more resistant than the spring 45. But, it is not desirable that this be done, for, if the spring 44 were made stiffer than the spring 45, then the shoulder 15' on the valve-stem (see Fig. 9) would engage the bonnet bushing 12' with so much force as to damage the same. The shoulder 15' would be jammed so hard against the bonnet bushing 12' that the spring 45 would then have to be stronger than the spring 44 in order to start the valve in closing direction. Consequently, if the spring 44 were made stiffer than the spring 45, the result of seating the shoulder 15' gently against the bonnet bushing 12' could not be accomplished.

To accomplish this result and yet allow the motor to apply sufficient torque, to the valve-actuating mechanism during the initial opening movement of the valve, the present invention provides the spring 44 with less tension than the spring 45, and further provides a stop collar 175 preferably formed integral with the sleeve 49 (see Fig. 1). This stop collar 175 is so arranged that, when the motor 29 commences to turn in valve-opening direction, the torque of large magnitude, which is required to unseat the valve, will cause the worm-shaft 26 to move in the direction of the tailless arrow, Fig. 1. This will bring the anti-friction thrust bearing 47 against the end of the stop-collar 175 with the result that the full torque of the motor may be applied to the valve-actuating mechanism to crack the valve. When the power required to continue the upward movement of the valve diminishes, as it does as soon as the valve is out of the seat, the spring 44 moves the worm-shaft 26 axially until the desired balance between the normal load resistance of the valve actuating mechanism and the tension of the spring 44, causes the shaft to again assume a substantially neutral position approximating that shown in Fig. 1.

Figure 10:
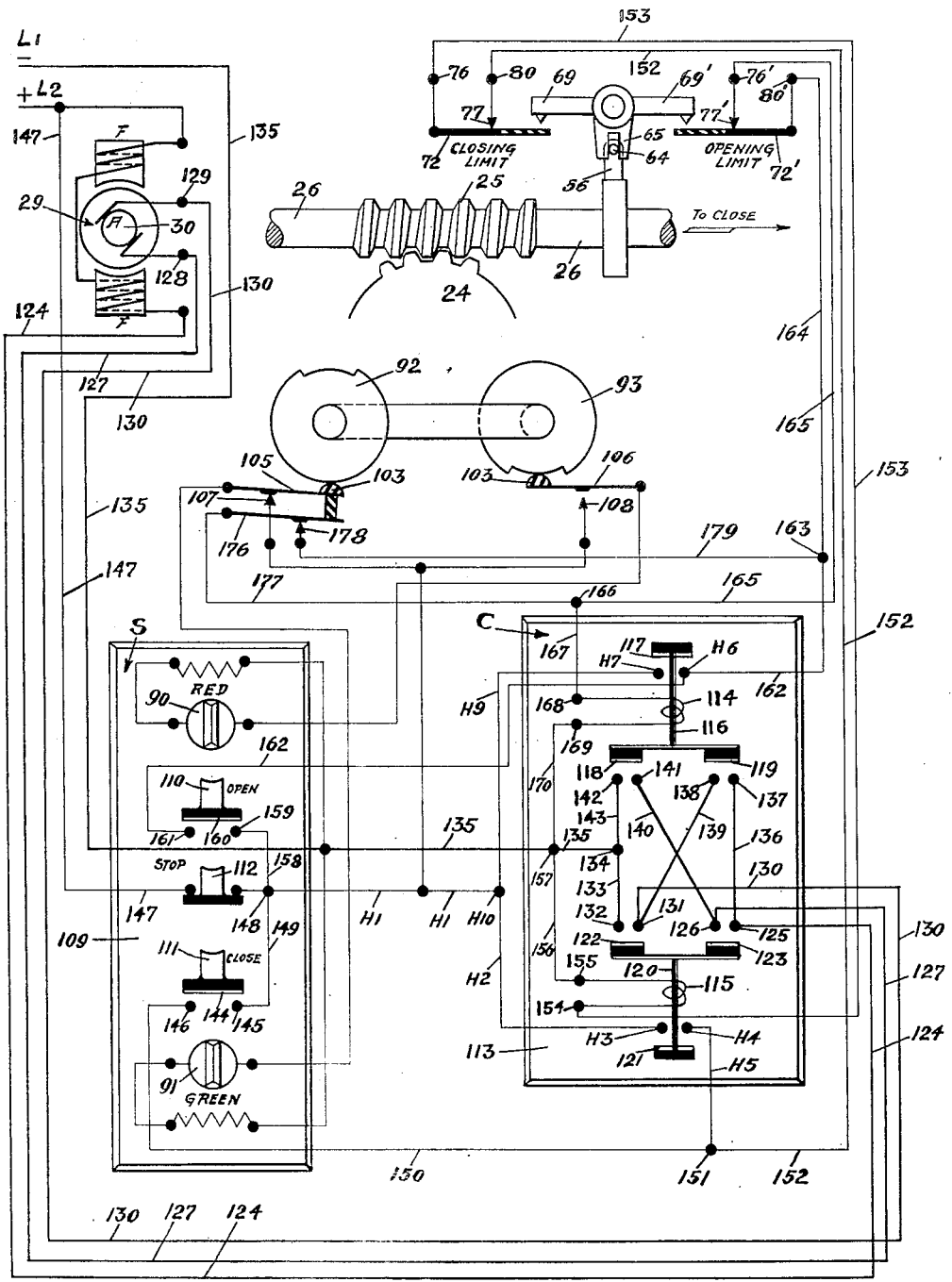
Fig. 10 is a schematic view of parts of the device of the present invention, including a wiring diagram to show how the various parts are connected together electrically.

As the shoulder 15' on the valve-stem comes in contact with the bonnet bushing 12', the resistance or load on the valve-actuating parts again increases, and this causes the worm-shaft 26 to move in the direction of the arrow causing the shaft 66 (see Fig. 8) to rock clockwise with the result that the insulating button 81' on the lever 69, engages the spring contact 72' and opens the circuit between the latter and the contact point 80'. This results in the motor being rendered inoperative by cutting off its supply of current. It will be remembered that the shaft 26 moves endwise at the initial opening or cracking of the valve. This movement too is sufficient to operate the arm 69' to open the circuit by the spring contact 72' and the contact point 77. But, at this time, it is not desired that the motor be rendered inoperative, for the valve has only started to move in opening direction. For the purpose of rendering this automatic switch inoperative during the initial opening or cracking of the valve, the present invention provides a circuit and automatic switch adapted to short circuit the switch 72' and 77' during this initial cracking of the valve. Clearly, it is preferable that such a switch be controlled by the position of the valve. Hence, the present invention employs the switch normally used to control the pilot light for this purpose. Accordingly, the cam disk 92 (see Figs. 2, 4, 5 and 10) which controls the green or closing pilot light 91 operates a spring contact 176 which is in addition to the spring contact 105 which controls the pilot light 91. This spring contact 176 is connected by a wire 177 to the junction 166 leading through the wire 167, terminal 168 to the solenoid 114 and being the same junction from which the wire 165 leads to the contact point 76' of the automatic opening switch, the contact spring 176 cooperating with a contact point 178 connected by a wire 179 to a junction 163 that leads to the other terminal 80' of the automatic switch 72' and 77'. Thus it will be seen that when the contact spring 176 is in its operative position, as shown in Fig. 10, the circuit through the solenoid 114 is held closed in spite of the fact that the switch 72' and 77' might be opened by operation of the arm 69' as a result of endwise movement of the worm-shaft 26. As the valve-disk approaches its open position, the follower 103 for the cam 92 enters the cut-away portion in the cam allowing the spring contact 176 to move away from the contact point 178. This restores the control circuit to the condition in which it was when the opening button 110 was first operated.

Hence, when the shoulder 15' on the valve-stem 15 engages the bonnet bushing 12', the valve-actuating train ceases to move, the spring 44 yields and the worm-shaft 26 moves axially causing the arm 69' connected therewith to open the control circuit. This causes the solenoid 114 to be deenergized and allows the armature 116 to take its contact 117, 118 and 119 away from their cooperating contact points with the result that the motor is no longer supplied with power and consequently stops.

Of course, at the same time that the follower 103 enters the cut-away portion of the cam-disk 92, the circuit controlled by contact spring 105 and contact point 107 leading to the green pilot light 91 is interrupted with the result that the light no longer glows indicating that the valve is opened. In the same manner, when the valve approaches its closed position, the follower 103 of the cam-disk 93 allows the spring contact 106 to move away from its cooperating contact point 108 to open the circuit through the red or open pilot light 90. It will also be noted that during the intermediate stages of movement between the closed position and the open position, both lights glow apprising the operator of the fact that the valve is neither open completely nor closed completely.

Variations and modifications may be made within the scope of this invention, and portions of the improvements used without others.

Having thus described the invention, what is claimed as new and for which it is desired to obtain Letters-Patent, is:—

1. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means actuated by the movement of the motor after the valve is closed for rendering the motor temporarily inoperative to apply power to the valve actuating mechanism.

2. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means actuated by movement of the motor upon cessation of movement of the valve actuating mechanism for rendering the motor temporarily inoperative to apply power to the valve actuating mechanism.

3. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including an overload-responsive mechanical mechanism operated upon cessation of movement of the valve for rendering the motor temporarily inoperative to apply power to the valve actuating mechanism.

4. In a valve control, valve-actuating mechanism; a driving motor therefor; means operated by the motor after the valve is closed for rendering the motor temporarily inoperative to apply power to the valve-actuating mechanism; and means for again making said motor operative to apply power in closing direction to the valve-actuating mechanism, said last-named means being operative while the valve is closed.

5. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means operative when the valve is closed for repeatedly operating the motor in valve closing direction without reversing the same to drive the valve firmly into its seat.

6. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means controlled by the reaction resulting from cessation of movement of the valve and continued driving force of the motor and actuated by the movement of the motor for rendering the motor temporarily inoperative to apply further power to the valve-actuating mechanism.

7. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means operative when the load of the motor reaches a predetermined point and controlled by the continued operation of the motor for rendering the motor temporarily inoperative to apply power to the valve actuating mechanism.

8. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means actuated by the movement of the motor after the valve is closed for rendering the motor temporarily inoperative to apply power to the valve actuating mechanism; a switch for controlling the motor circuit; and means operated by the motor after cessation of movement of the valve actuating mechanism for operating the switch to cause the motor circuit to be broken and temporarily render the motor inoperative to apply power to the valve actuating mechanism.

9. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including an electric circuit control for controlling the effectiveness of the motor on the valve actuating mechanism, and means operated by the motor after cessation of movement of the valve actuating mechanism for operating the circuit control to render the motor inoperative to apply power to the valve actuating mechanism; and means to automatically return the circuit control to its initial condition upon cessation of movement of the motor.

10. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including an electric circuit and switch therein for controlling the effectiveness of the motor on the valve actuating mechanism; and means operated by the motor after cessation of movement of the valve actuating mechanism for operating said switch to render the motor inoperative to apply force to the valve actuating mechanism.

11. In a valve opening and closing device having valve actuating mechanism and a driving motor therefor; means for automatically controlling the closing and opening movements of the valve by said motor and valve actating mechanism and for automatically determining the extents of movements of the valve in both closing and opening direction, said means including means operated when the motor applies a predetermined torque to the valve actuating mechanism incidental to cessation of movement of the valve for rendering the motor temporarily inoperative to apply power to the valve actuating mechanism.

12. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including automatic means operated when the motor applies a predetermined torque to the valve actuating mechanism incidental to the seating of the valve for rendering the motor inoperative temporarily to apply force to the valve actuating mechanism, said last-named means being inoperative in the initial unseating of the valve.

13. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including automatic means operated when the motor applies a predetermined torque to the valve actuating mechanism incidental to the seating of the valve for rendering the motor temporarily inoperative to apply power to the valve actuating mechanism; and other automatic means to prevent operation of the last-named means and permit the motor to apply torque in excess of the said predetermined torque to the valve actuating mechanism during the initial opening movement or "cracking" of the valve.

14. In a valve control, valve-actuating mechanism; a driving motor therefor; automatic means operated when the motor applies a predetermined torque to the valve-actuating mechanism incidental to the seating of the valve for rendering the motor inoperative to apply power to the valve-actuating mechanism; means to prevent operation of the automatic means and permit the motor to apply torque in excess of the said predetermined torque to the valve-actuating mechanism during the initial opening movement or "cracking" of the valve; and means for rendering the last-named means inoperative before the valve reaches the limit of its movement in opening direction.

15. In a valve control, valve-actuating mechanism; a driving motor therefor; automatic means operated when the motor applies a predetermined torque to the valve-actuating mechanism incidental to the seating of the valve for rendering the motor inoperative to apply power to the valve-actuating mechanism; means to prevent operation of the automatic means and permit the motor to apply torque in excess of the said predetermined torque to the valve-actuating mechanism during the initial opening movement or "cracking" of the valve; means for rendering the last-named means inoperative before the valve reaches the limit of its movement in opening direction; and automatic means operated when the motor applies a predetermined torque to the valve-actuating mechanism incidental to the arrival of the valve at the limit of its movement in opening direction for rendering the motor inoperative to apply power to the valve-actuating mechanism.

16. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including automatic means mechanically operated by the motor when the motor applies a predetermined torque to the valve actuating mechanism incidental to the arrival of the valve at the limit of its movement in opening direction for rendering the motor inoperative to apply force to the valve actuating mechanism in opening direction.

17. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including automatic means operated when the motor applies a predetermined torque to the valve actuating mechanism incidental to the arrival of the valve at the limit of its movement in opening direction for rendering the motor temporarily inoperative to apply force to the valve actuating mechanism; and other automatic means for preventing operation of the last-named automatic means during the initial opening or "cracking" of the valve.

18. In a valve control, a motor; valve-actuating mechanism operated by the motor and comprising a gear train having members whose characteristics are such that cessation of movement of one member while the other member is moved by the motor produces an end-thrust movement of one of the members; switch means controlled by said end-thrust movement for rendering the motor inoperative to apply power to the valve-actuating mechanism; and means for returning said thrusted member and switch to normal position when the motor has been made inoperative to apply power to the valve-actuating mechanism.

19. In a valve control, valve-actuating gearing; a driving motor therefor; electric switches operated when the motor applies a predetermined torque to the valve-actuating gearing incidental to the seating of the valve for rendering the motor inoperative to apply power to the valve-actuating gearing; another electric switch shunting the first-named switch to prevent operation of the latter to control the motor and permit the motor to apply torque in excess of the said predetermined torque to the valve-actuating gearing during the initial opening movement or "cracking" of the valve; and means for rendering the last-named electric switch inoperative before the valve reaches the limit of its movement in opening direction.

20. In a valve control, valve-actuating mechanism; a driving motor therefor; means operated by the motor after the valve is opened for rendering the motor temporarily inoperative to apply power to the valve-actuating mechanism; and means for again making said motor operative to apply power in opening direction to the valve-actuating mechanism, said last-named means being operative while the valve is opened.

21. In a valve opening and closing device, valve-actuating mechanism; a driving motor therefor; control means manually initiated and automatically maintained operative for rendering the motor operative to move the valve-actuating mechanism in valve closing direction; and means operated when the motor applies a predetermined torque to the valve actuating mechanism incidental to cessation of movement of the valve and operative on said control means for rendering the motor inoperative to apply force to the valve-actuating mechanism.

22. In a valve opening and closing device, valve-actuating mechanism; a driving motor therefor; automatic means operated when the motor applies a predetermined torque to the valve-actuating mechanism incidental to cessation of movement of the valve in opening direction for rendering the motor inoperative to apply power to the valve-actuating mechanism, said means comprising a motor control circuit and an automatic switch therein; and other automatic means to prevent operation of said first-named automatic means and permit the motor to apply torque in excess of the said predetermined torque to the valve-actuating mechanism during the initial opening movement or "cracking" of the valve, said last-named means comprising a shunt circuit around the said automatic switch in the motor control circuit to prevent a gap in the circuit being produced by said automatic switch during the initial opening or "cracking" movement of the valve.

23. In a valve opening and closing device, valve-actuating mechanism; a driving motor therefor; automatic means operated when the motor applies a predetermined torque to the valve-actuating mechanism incidental to cessation of movement of the valve in opening direction for rendering the motor inoperative to apply power to the valve-actuating mechanism, said means comprising a motor control circuit and an automatic switch therein; means to prevent operation of said automatic means and permit the motor to apply torque in excess of the said predetermined torque to the valve-actuating mechanism during the initial opening movement or "cracking" of the valve, said last-named means comprising a shunt circuit around the said automatic switch in the motor control circuit to prevent a gap in the circuit being produced by said automatic switch during the initial opening or "cracking" movement of the valve; and a switch in said shunt circuit adapted to open the latter upon completion of the initial movement or "cracking" of the valve to return the control of the motor control circuit to said automatic switch.

24. In a valve opening and closing device, valve-actuating mechanism; a driving motor therefor; automatic means operated when the motor applies a predetermined torque to the valve-actuating mechanism incidental to cessation of movement of the valve in opening direction for rendering the motor inoperative to apply power to the valve-actuating mechanism, said means comprising a motor control circuit and an automatic switch therein; means to prevent operation of said automatic means and permit the motor to apply torque in excess of the said predetermined torque to the valve-actuating mechanism during the initial opening movement or "cracking" of the valve, said last-named means comprising a shunt circuit around the said automatic switch in the motor control circuit to prevent a gap in the circuit being produced by said automatic switch during the initial opening or "cracking" movement of the valve; and means operated coordinately with the valve actuating mechanism for rendering said shunt circuit operative when the valve is closed and also when the valve is opened a predetermined extent and for rendering the shunt circuit inoperative when the valve is opened beyond said predetermined extent.

25. In a valve opening and closing device, valve-actuating mechanism; a driving motor therefor; automatic means operated when the motor applies a predetermined torque to the valve-actuating mechanism incidental to cessation of movement of the valve in opening direction for rendering the motor inoperative to apply power to the valve-actuating mechanism, said means comprising a motor control circuit and an automatic switch therein; means to prevent operation of said automatic means and permit the motor to apply torque in excess of the said predetermined torque to the valve-actuating mechanism during the initial opening movement or "cracking" of the valve, said last-named means comprising a shunt circuit around the said automatic switch in the motor control circuit to prevent a gap in the circuit being produced by said automatic switch during the initial opening or "cracking" movement of the valve; and a switch device operated coordinately with the valve-actuating mechanism for rendering said shunt circuit operative when the valve is closed and also when the valve is opened a predetermined extent, and for rendering the shunt circuit inoperative when the valve is opened beyond said predetermined extent.

26. In a valve opening and closing device, valve-actuating mechanism; a driving motor therefor; automatic means operated when the motor applies a predetermined torque to the valve-actuating mechanism incidental to cessation of movement of the valve in opening direction for rendering the motor inoperative to apply power to the valve-actuating mechanism, said means comprising a motor control circuit and an automatic switch therein; means to prevent operation of said automatic means and permit the motor to apply torque in excess of the said predetermined torque to the valve-actuating mechanism during the initial opening movement or "cracking" of the valve, said last-named means comprising a shunt circuit around the said automatic switch in the motor control circuit to prevent a gap in the circuit being produced by said automatic switch during the initial opening or "cracking" movement of the valve; pilot lights for indicating the condition of the valve; means operated coordinately with the valve-actuating mechanism for controlling said pilot lights; and means operated by the last-named means for rendering said shunt circuit operative when the valve is closed, and also when the valve is opened a predetermined extent, and for rendering the shunt circuit inoperative when the valve is opened beyond said predetermined extent.

27. In a valve control, valve-actuating mechanism; a driving motor therefor; automatic means operated when the motor applies a predetermined torque to the valve-actuating mechanism incidental to the seating of the valve for rendering the motor inoperative to apply power to the valve-actuating mechanism; means to prevent operation of the automatic means and permit the motor to apply torque in excess of the said predetermined torque to the valve-actuating mechanism during the initial opening movement or "cracking" of the valve; means for rendering the last-named means inoperative before the valve reaches the limit of its movement in opening direction; and automatic means operated when the motor applies a predetermined torque to the valve-actuating mechanism incidental to the arrival of the valve at the limit of its movement in opening direction for rendering the motor inoperative to apply power to the valve-actuating mechanism, said automatic means being so arranged that the predetermined torque applied to the valve-actuating mechanism incidental to the arrival of the valve at the limit of its movement in opening direction is less than the predetermined torque applied to the valve-actuating mechanism incidental to the seating valve.

28. In a valve opening and closing device, valve-actuating mechanism; a driving motor for operating the valve through said valve-actuating mechanism to move the valve between limits of movement defined by the valve seat and a bonnet bushing for the valve; and means for automatically seating the valve with substantially heavy pressure but moving it against its bonnet bushing with relatively light pressure.

29. In a valve opening and closing device having valve actuating mechanism and a driving motor therefor; a bonnet bushing for the valve; means for automatically controlling the closing and opening movements of the valve by said motor and valve actuating mechanism and for automatically determining the extents of movements of the valve in both closing and opening direction, said means including means controlling the motor for causing the valve to move automatically into engagement with its bonnet bushing with predetermined and positive pressure thereagainst by the power of the motor.

30. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means actuated by the movement of the motor upon cessation of movement of the valve for rendering the motor temporarily inoperative.

31. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means operated by the motor upon cessation of movement of the valve in closing direction resulting from an obstruction in the path of the valve, which prevents its closing, for rendering the motor inoperative temporarily to apply power to the valve in closing direction; and means for automatically rendering the last-named means inoperative upon cessation of movement of the motor to permit to motor to again apply power to the valve in closing direction to close the valve should the obstruction have been removed in the interim.

32. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means operative when the valve is in all positions adjacent closed position for repeatedly operating the motor in valve closing direction without necessitating the reversing of the same to first open the valve to any predetermined point or for any predetermined extent.

33. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means operable at any point in the opening movement of the valve for causing the motor to be inoperative to drive the valve actuating mechanism to stop the movement of the valve, and means for causing the motor to be operative in valve closing direction regardless of the point in its travel where the valve may be stopped.

34. In a valve opening and closing device having valve actuating mechanism and a driving motor therefor; means for automatically controlling the closing and opening movements of the valve by said motor and valve actuating mechanism and for automatically determining the extents of movements of the valve in both closing and opening direction, said means including means operable at any point in the movement of the valve for causing the motor to be inoperative to drive the valve actuating mechanism to stop the valve; and means for causing the motor to again be operative on the valve for either opening or closing regardless of the point in its travel where the valve may be stopped.

Signed at Bridgeport, in the county of Fairfield, and State of Connecticut, this 1st day of February, 1928.

ERWIN J. PANISH.

DISCLAIMER 1,747,594.—*Erwin J. Panish*, Bridgeport, Conn. VALVE CONTROL. Patent dated February 18, 1930. Disclaimer filed August 13, 1942, by the inventor.

Hereby enters this disclaimer to claims 1, 2, 3, 4, 5, 6, 7, 8, 9, 10, 11, 12, 13, 14, 15, 16, 17, 18, 20, 21, 30, 31, 32, 33, and 34 of said patent.

[*Official Gazette September 8, 1942.*]